United States Patent
Herz

(10) Patent No.: US 6,917,217 B2
(45) Date of Patent: Jul. 12, 2005

(54) DEVICE FOR PREPARING AN INPUT SIGNAL FOR A LINE WHICH IS MISMATCHED ON THE OUTPUT SIDE

(75) Inventor: Manfred Herz, Mainz (DE)

(73) Assignee: IC-Haus GmbH, Bodenheim (DE)

( * ) Notice: Subject to any disclaimer, the term of this patent is extended or adjusted under 35 U.S.C. 154(b) by 0 days.

(21) Appl. No.: 10/631,647

(22) Filed: Jul. 31, 2003

(65) Prior Publication Data

US 2004/0066211 A1 Apr. 8, 2004

(30) Foreign Application Priority Data

Jan. 31, 2001 (DE) ..................................... 201 01 605 U
Jan. 18, 2002 (WO) ............................... PCT/EP02/00454

(51) Int. Cl.[7] ............................................... H03K 17/16
(52) U.S. Cl. ........................... 326/21; 326/30; 326/32; 326/83
(58) Field of Search ....................... 326/21–24, 26–30, 326/32, 83, 86, 90; 327/108–112; 710/100, 126

(56) References Cited

U.S. PATENT DOCUMENTS

| | | | | |
|---|---|---|---|---|
| 4,760,292 A | * | 7/1988 | Bach | 326/86 |
| 5,686,872 A | * | 11/1997 | Fried et al. | 333/22 R |
| 5,760,601 A | | 6/1998 | Frankeny | 326/30 |
| 5,898,326 A | * | 4/1999 | Okayasu | 327/112 |
| 6,051,989 A | * | 4/2000 | Walck | 326/30 |
| 6,265,893 B1 | * | 7/2001 | Bates | 326/30 |
| 6,677,778 B2 | * | 1/2004 | Lindsay et al. | 326/30 |

FOREIGN PATENT DOCUMENTS

WO   WO 00/57570   9/2000

OTHER PUBLICATIONS

Article: "Low–Noise, High Speed Data Transmission Using a Ringing–Canceling Output Buffer", IEEE Journal of Solid–State Circuits, vol. 30, No. 12, Dec. 1995.

* cited by examiner

Primary Examiner—Vibol Tan
(74) Attorney, Agent, or Firm—Ohlandt, Greeley, Ruggiero & Perle, L.L.P.

(57) ABSTRACT

There is provided an apparatus for generating an input signal for a cable that is mismatched on an output side. The apparatus has a line driver for connecting to an input of the cable via a resistor. The line driver includes a controller that, depending on a data input signal, is for triggering (a) a first switch to apply a supply voltage at an input of the resistor, (b) a second switch to apply a reference potential at the input of the resistor, and (c) a third switch to apply an auxiliary voltage at the input of the cable, all of them at predeterminable points in time, in order to minimize power dissipation in the resistor.

9 Claims, 4 Drawing Sheets

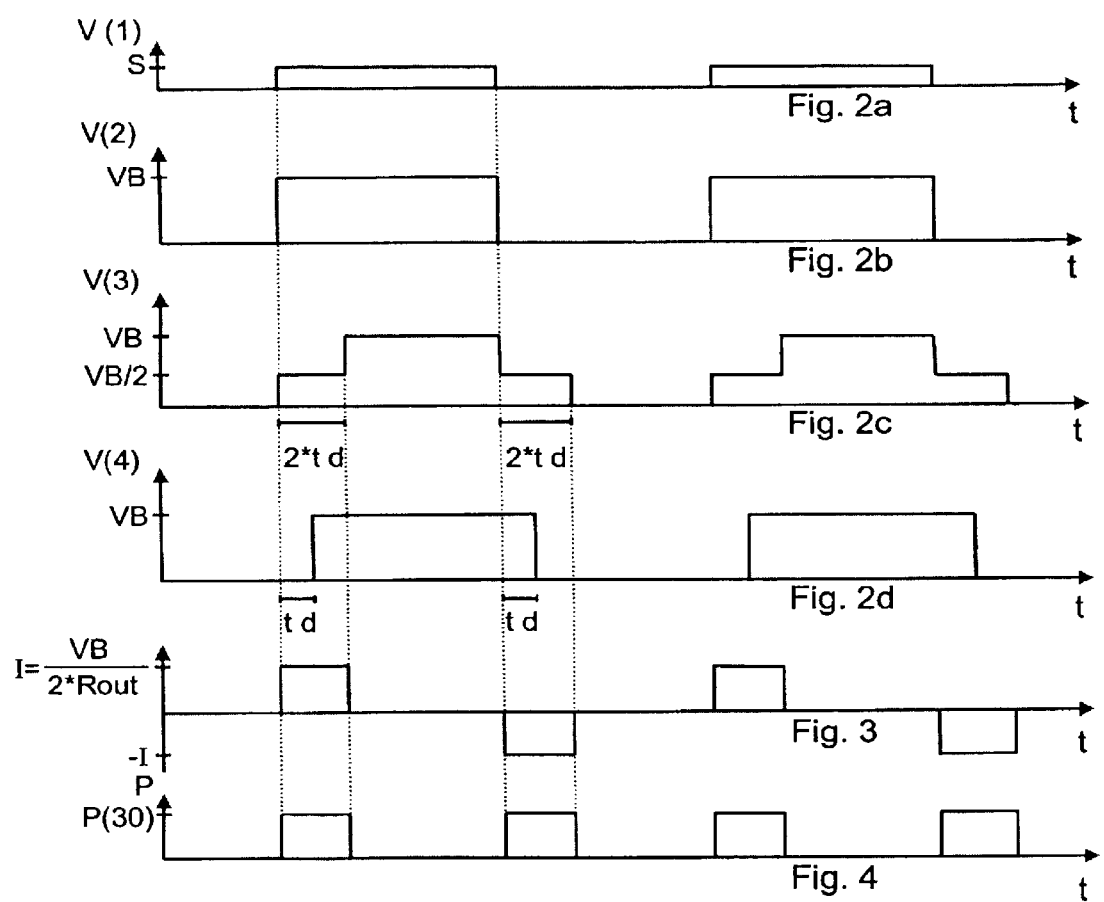

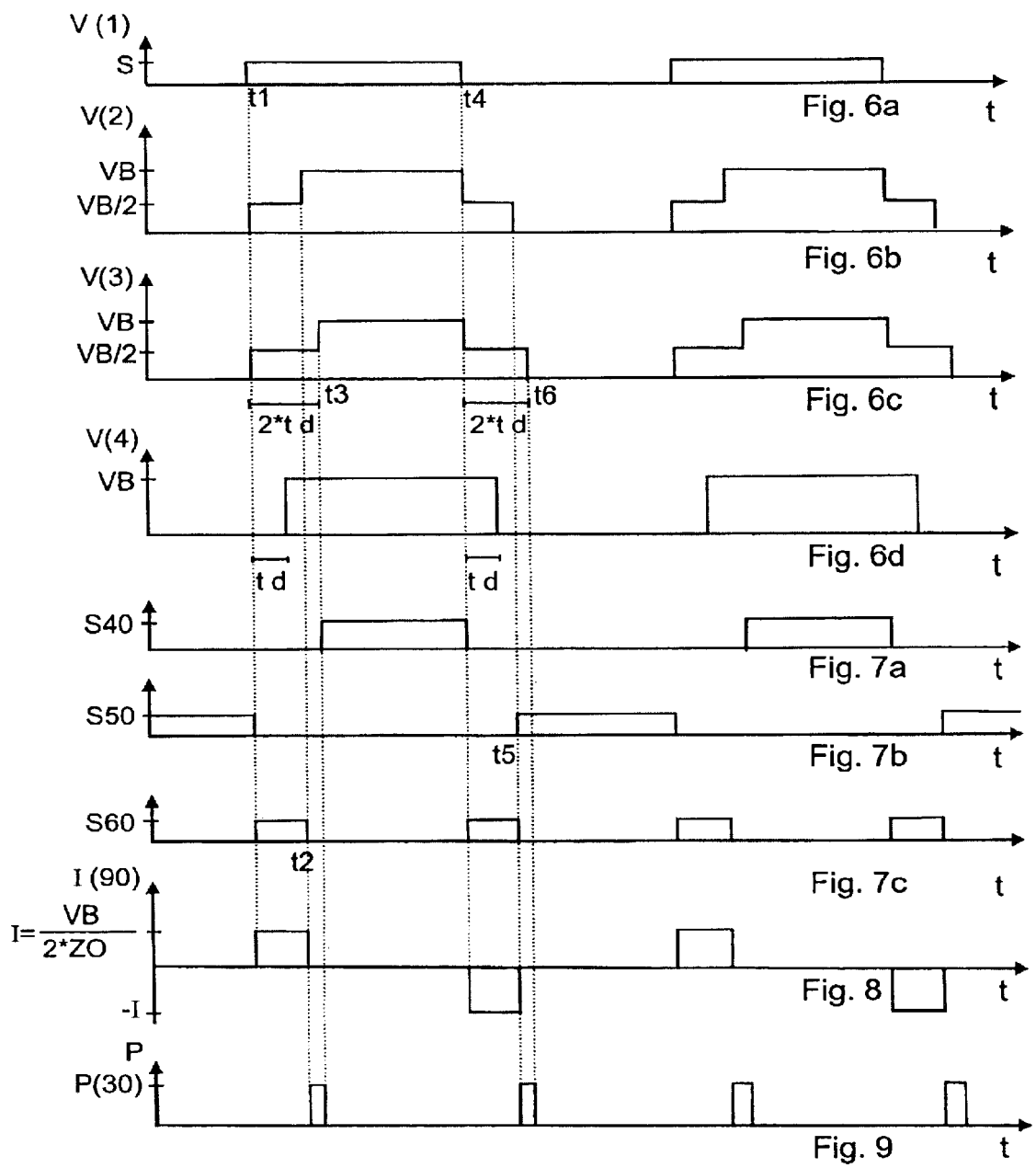

DEVICE FOR PREPARING AN INPUT SIGNAL FOR A LINE WHICH IS MISMATCHED ON THE OUTPUT SIDE

FIELD OF INVENTION

The invention concerns an apparatus for providing an input signal for a cable that is mismatched on the output side as well as a line driver for use in combination with such an apparatus.

BACKGROUND OF THE INVENTION

To transfer data via multi-core cable, in particular two-wire cable, it is customary to use line drivers that are able to supply a sufficiently high output current. Line drivers of this kind are widely known.

Customarily, a line driver is connected via its output resistor to the input of a cable, which has an characteristic impedance that is significantly smaller than the cable's terminating resistor. The output resistor, by contrast, corresponds to the cable's characteristic impedance. This kind of arrangement, the functionality of which will be outlined in greater detail below, is shown in FIG. 1. One of the disadvantages of conventional line drivers is the fact that a relatively high power dissipation is generated in the output resistor. This power dissipation depends among other things on the voltage applied to the input of the output resistor and the voltage occurring at the input of the cable that is affected by signal components reflected at the cable outlet.

It is an object of the invention to design a device for providing an input signal for a cable that is mismatched on the output side as well as an appropriate line driver for use in combination with such a device, using which it is possible to significantly reduce the power dissipation in the output resistor of the line driver compared to a conventional line driver arrangement.

SUMMARY OF THE INVENTION

The central idea behind the invention is to develop a line driver that generates a voltage curve at the input of the output resistor of the line driver that is approximate to the voltage curve at the input of a cable that is preferably matched on the input side, which is in turn affected by signal components reflected at the cable end. In this way it will be possible to significantly reduce the period during which a current flows through the output resistor and thus the power dissipation generated in the output resistor of the line driver.

The invention solves the abovementioned technical problem on the one hand with the features of claim 1.

For this purpose, the device for providing an input signal for a cable that is mismatched on the output side is equipped with a line driver that is connected to the cable input via a resistor (in the following also referred to as output resistor). In addition, control means have been implemented in the line driver that can, depending on the presence of a data input signal, control a first switch to apply a supply voltage at the input of the resistor, a second switch to apply a reference potential at the input of the resistor and a third switch to apply an initial auxiliary voltage at the input of the cable—all of them at predeterminable points in time—in order to minimize the power dissipation in the resistor.

It should be mentioned at this point that a "cable that is mismatched on the output side" mainly refers to a cable connected to a terminating resistor that is greater than the cable's own iterative impedance. A 1 kOhm resistor might, for example, be connected. It is, however, possible to use smaller resistors.

In order to reduce the power loss in the resistor to a maximum degree, it is necessary to determine the point in time at which the data input signal reflected at the cable output appears at the cable input. Once this point in time has been ascertained, it is possible to open the third switch immediately prior to the arrival of the reflected signal at the cable input. This is because the time between the third switch being opened and the arrival of the reflected signal at the cable input determines the time during which a current flows through the resistor, thus giving rise to a power loss in the resistor. For this purpose, the line driver is equipped with a current or voltage detector connected to the cable input as well as means for evaluating that, depending on the data input signal and the output signal supplied by the current and voltage detector, determines the times to open and close the first, second and third switch.

As long as the line driver is operated in a cool environment, the heat build-up in the resistor will not affect the line driver's efficiency. Therefore, given an adequately low component temperature, it is possible to operate the line driver like a conventional line drive, i.e. without triggering the third switch. However, exceeding a certain critical component temperature may result in the line driver becoming damaged or even destroyed. This can be avoided by minimizing the power loss in the resistor once a specified critical temperature has been exceeded. As has already been mentioned, this is done by using the third switch to apply the first auxiliary voltage. With the aid of a temperature sensor, it is now possible to determine when a critical component temperature is exceeded. If the critical temperature is exceeded, the control means activates the third switch as well as the second and third switch accordingly.

For practical purposes the impedance of the resistor at the cable input has the same value as the cable's characteristic impedance.

Since, in the case of a cable that is mismatched on the output side, the output voltage is at times approximately twice as large as the input voltage, the first auxiliary voltage essentially amounts to half the supply voltage in order to prevent the output voltage of the cable from exceeding the supply voltage and thus damaging connected loods.

The power dissipation in the resistor can be further reduced, for example, by applying a second auxiliary voltage to the cable input at predetermined points in time via a fourth switch controlled by the control means. For practical purposes, the first auxiliary voltage is greater than half the supply voltage, whereas the second auxiliary voltage has a value below that of half of the supply voltage in order to optimize the voltage curve at the cable end. In this way it is possible to generate a distorted stepped voltage curve at the cable input that, together with the voltage curve at the input of the resistor, is able to further reduce the current through the resistor. In this way it is possible to compensate for voltage drops along the cable.

The third switch can be connected to the reference potential via a capacitor. The capacitor serves to feed a predetermined current into the cable and to receive it back from the line again.

For practical purposes, the control means, the first switch, the second and third and if necessary additional switches, the current or voltage detector, the temperature sensor, the evaluator as well as the resistor are designed as an integrated circuit.

The technical problem is also solved with the features of claim 7 that relates to a line driver.

BRIEF DESCRIPTION OF THE DRAWINGS

The invention will be explained in greater detail in the following on the basis of a design example in conjunction with the enclosed technical drawings that show:

FIGS. 2a–2d the voltage curves at four different reference points between the input of the line driver and the cable output;

FIG. 3 the voltage curve through the output resistor of the line driver;

FIG. 4 the power dissipation occurring in the output resistor;

FIGS. 6a–6d the voltage curves at four reference points between the input of the line driver and the cable output;

FIGS. 7a–7c the control signals for closing and opening the first, second and third switch;

FIG. 8 the current flow via the closed third switch, and

FIG. 9 the power loss occurring in the output resistor

DETAILED DESCRIPTION OF THE PREFERRED EMBODIMENT

Figure 1:
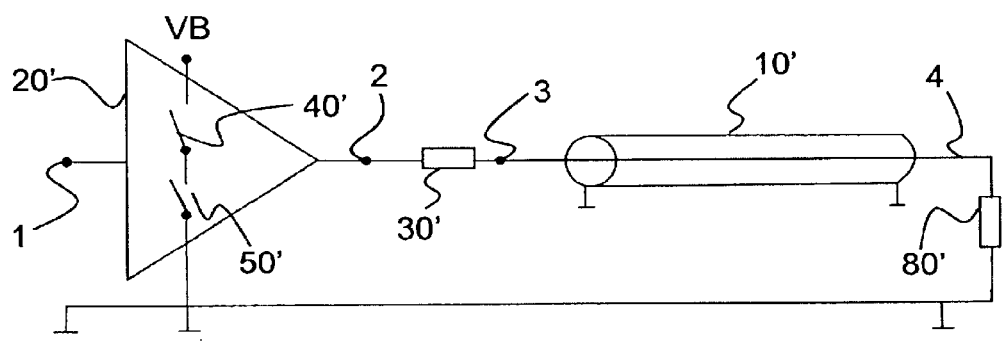
FIG. 1 a conventional line driver that is connected to a cable that is mismatched on the output side.

FIG. 1 shows a conventional line driver 20', as mentioned before, that is connected to a cable 10' via an output resistor 30' at input 3. Cable 10' ends with a terminating resistor 80', which in terms of its value is considerably higher than the characteristics impedance of cable 10'. Line driver 20' comprises a first switch 40' for applying a supply voltage VB at input 2 of output resistor 30'. Furthermore, a second switch 50' is planned for line driver 20', via which input 2 of output resistor 30' is connected to ground. For practical purposes, the resistance of output resistor 30' is equal to the characteristic impedance of cable 10'.

The operation of the conventional line driver can best be described in connection with the curves displayed in FIGS. 2a–2d and FIGS. 3 and 4.

FIG. 2a shows the data signal applied to input 1 of line driver 20' for the purpose of transmission via cable 10'. The data signal comprises, for example, a series of zeroes and ones that might correspond to the low level and high level, respectively, of the data signal, for instance. When applying a one to input 1 of line driver 20', the supply voltage VB is fed via switch 40' to the input of resistor 30' as shown in FIG. 2b. Since output resistor 30' and cable 10' act as a voltage divider, half the supply voltage applies to input 3 for the period 2 td, which corresponds to twice the time delay of cable 10'. As a result of the mismatch on the output side, the data signal transmitted through cable 10' is partially reflected. This is why the voltage at input 3 of cable 10' increases sharply to the level of the supply voltage after period 2 td. At the end of the data signal, switch 40' is opened again and switch 50' is closed. At this point in time the voltage drops to the level of the reference potential, whereas the voltage at input 3 of cable 10' drops to half of the supply voltage for the period 2 td after which it drops to the reference potential. Comparison of the voltage curves depicted in FIGS. 2b and 2c reveals that after applying the supply voltage to input 2 and after disconnecting the supply voltage, a voltage across output resistor 30' drops for the period 2 td, resulting in a current flow in output resistor 30' as depicted in FIG. 3. The corresponding power dissipation in output resistor 30' is depicted in FIG. 4. The output signal at output 4, which is delayed by the time delay td of cable 10' compared to the data input signal, is depicted in FIG. 2d.

Figure 5:
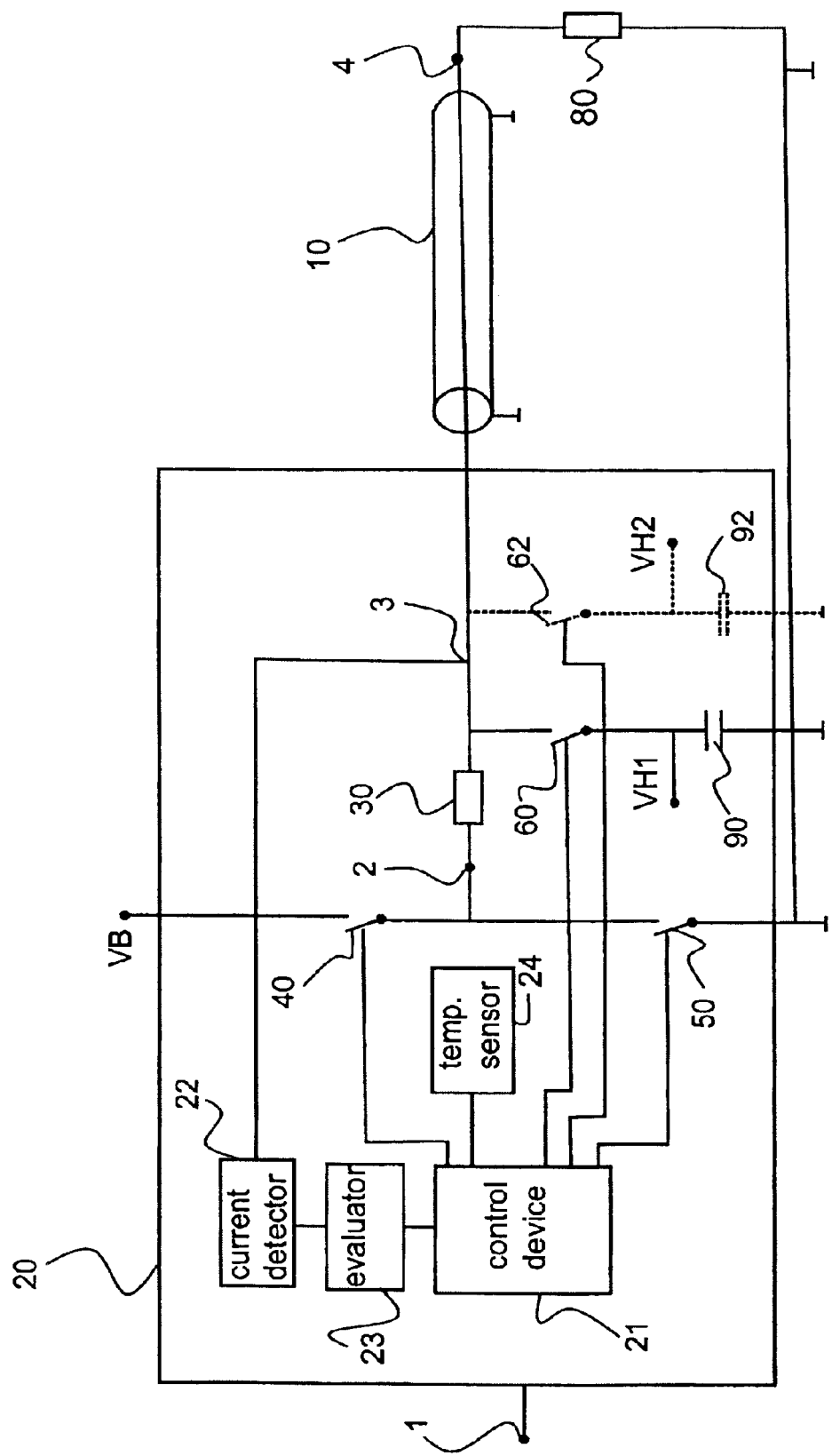
FIG. 5 the line driver in accordance with the invention that is connected to a cable that is mismatched on the output side.

With the arrangement displayed in FIG. 5, it is now possible to reduce the flow of current through output resistor 30 and thus the power dissipation compared to the conventional line driver depicted in FIG. 1.

Line driver 20 depicted in FIG. 5 is first connected to input 3 of cable 10 via output resistor 30. Output 4 of Cable 10 ends with terminating resistor 80, whose value is significantly higher than the characteristic impedance of cable 10. In other words, cable 10 is considerably mismatched on the output side. Line driver 20 is equipped with a current or voltage detector 22 that is connected to input 3 of cable 10. The voltage or current detector 22 is connected to evaluator 23 the purpose of which will be outlined in greater detail in the following. Furthermore, a control device 21 of line driver 20 is connected to a first switch 40 for applying a supply voltage to input 2 of resistor 30, to a second switch 50 for applying a reference potential, and in particular a connection to ground, to input 2 of resistor 30, and to a third switch 60 for applying an initial auxiliary voltage VH1 to input 3 of cable 10. Alternatively, it is possible to connect the control device to further switches for supplying various different auxiliary voltages. FIG. 5 displays only one further switch 62 for applying a second auxiliary voltage VH2, depicted with a dotted line. Switches 60 and 62 are grounded via capacitors 90 and 92.

In the course of the ongoing description of the invented line driver 20 only switch 60 and the first auxiliary voltage will be discussed in greater detail. In addition, line driver 20 is connected to a temperature sensor 24 using which it is possible to measure the temperature of line driver 20. Temperature sensor 24 should preferably be connected to control device 21 to facilitate the determination of the instant when switches 40, 50 and 60 are activated as will be outlined in greater detail in the following.

The functionality of line driver 20 will be outlined in greater detail in the following on the basis of FIGS. 6a–6d, 7a–7c as well as FIGS. 8 and 9.

As already stated, line driver 20, as depicted in FIG. 5, with the aid of switch 60 and the auxiliary voltage connected to it, is capable of significantly reducing the power dissipation in output resistor 30 compared to the power dissipation in resistor 30' of the conventional line driver as depicted in FIG. 1. We will first take a closer look at FIGS. 7a–7c that depict the control signals supplied by control device 21 for closing and opening switches 40, 50 and 60. With the leading edge of the data signal as depicted in FIG. 6a, i.e. at time t1, switch 60 is closed and auxiliary voltage VH1 applied to input 3 of cable 10. The auxiliary voltage VH1 should preferably amount to half the supply voltage VB of line driver 20. At this point in time switches 40 and 50 are still open. Switches 40 and 50 remain open until time t2 as depicted in FIG. 7c, whereas switch 60 remains closed during this period. As shown in FIG. 6c, the period of time between t1 and t2 is shorter than twice the time delay 2 td of cable 10. As long as switch 60 is closed, auxiliary voltage VH1 (in the current example therefore half the supply voltage) will be applied to both input 2 of output resistor 30 and input 3 of cable 10. This fact is depicted in FIGS. 6b and 6c. Accordingly, no current flows through output resistor 30 during the period implying that there will not be any power loss in output resistor 30 either. This is shown clearly in FIG. 9. At time t2, switch 60 is now opened and switch 40 closed which causes the voltage at input 2 of output resistor 30 to increase sharply to the level of the supply voltage VB. At this instant there is a potential difference of approximately VB/2 at output resistor 30, namely at inputs 2 and 3, that causes a current to flow through output resistor 30. The corresponding power dissipation in output resistor 30 is shown in FIG. 9. However, as soon as the data signal reflected at cable output 4 after a period of 2 td (time t3), measured from time t1, arrives at input 3 of cable 10, the voltage at cable input 3 increases sharply to the level of the supply voltage. The potential difference at inputs 2 and 3 and therefore the power dissipation in output resistor 30 then drops to zero. At the end of the data signal, at time t4, switch 40 is opened, switch 50 remains opened and switch 60 is closed again. At time t6, switch 50 is closed and switch 60 is opened. At this point it should be stressed that the period of time t5–t4 is shorter than twice the time delay 2 td of cable 10. The switching sequences are shown in FIGS. 7a to 7c. As can be seen in FIGS. 6b and 6c, opening switch 40 and closing switch 60 at time t4 result in the voltages at inputs 2 and 3 simultaneously dropping from VB to VB/2. This voltage curve is maintained until time t5. After closing switch 50 and opening switch 60 at time t4, however, the voltage at input 2 drops sharply to the reference potential, whereas the voltage at input 3 does not drop to the reference potential until time t4+2 td (corresponds to t6) as a result of the data signal reflected at cable output 4. This can be attributed to the fact that the data signal reflected at the cable end appears at cable input 3 until time t6. Accordingly, the periods t3–t2 and t6–t5, that is to say the time between switch 60 being opened and the reflected signal arriving at input 3 of cable 10, respectively the time between switch 60 being opened and the reflected signal tapering off at the input of cable 10, determines the time during which the power dissipation is generated in output resistor 30. The power dissipation generated in output resistor 30 is shown in FIG. 9.

In order to keep the power dissipation in output resistor 30 to a minimum, it is therefore necessary to ensure that switch 60 is only opened shortly before the arrival of the reflected signal at input 3 at time t3 or immediately before the reflected signal decays at the input of cable 10 at time t6. Current or voltage detector 22 is connected to cable input 3 in order to determine the times t3 and t6 depicted in FIG. 6c.

For practical purposes, the first data bit transmitted at the start of the data transfer is used to determine these points in time. Depending on the data signal shown in FIG. 6a and the signal waveform recorded at input 3 by current or voltage detector 22, evaluator 23 determines the time t1 when switch 60 is closed, the time t2 when switch 60 is opened and switch 40 is closed, the time t4 when switch 40 is opened and switch 60 is closed again, and time t5 when switch 60 is opened and switch 50 is closed.

FIG. 8 shows the current flowing from capacitor 90 into cable 10 and vice versa from cable 10 into capacitor 90 when switch 60 is closed.

FIG. 6d, like FIG. 2d, shows the voltage curve at output 4 of cable 10 that is delayed by runtime $t_d$ of cable 10 compared to the input signal.

Normally, the dissipation heat generated in output resistor 30 does not lead to line driver 20 being damaged or destroyed provided that the component temperature is correspondingly low. For this reason line driver 20 as depicted in FIG. 5 can initially be operated without triggering switch 60 so long as the temperature remains non-critical. However, as soon as temperature sensor 24 records a pre-determined critical temperature being exceeded, control device 21 will be instructed to trigger switch 60 during the next switching cycle in order to reduce the power dissipation in output resistor 30 and hence the temperature of line driver 20 once again. In other words, given non-critical component temperatures, line driver 20 as shown in FIG. 5 can be operated just like a conventional line driver 20' as depicted in FIG. 1. Switch 60 will only be triggered if a critical temperature is exceeded.

A comparison of FIGS. 4 and 9 shows that in the case of the conventional line driver 20', heat dissipation (power dissipation) is generated in output resistor 30' over a period of 2 td, whereas in the case of the line driver as shown in FIG. 5, and used in conjunction with switch 60, power dissipation in output resistor 30 is only generated during the times t3–t2 and t6–t5.

What is claimed is:

1. An apparatus for generating an input signal for a cable that is mismatched on an output side, comprising:

a line driver for connecting to an input of the cable via a resistor, wherein the line driver includes a controller that, depending on a data input signal, is for triggering (a) a first switch to apply a supply voltage at an input of the resistor, (b) a second switch to apply a reference potential at the input of the resistor, and (c) a third switch to apply an auxiliary voltage at the input of the cable, all of them at predeterminable points in time, in order to minimize power dissipation in the resistor.

2. The apparatus according to claim 1, wherein in the line driver comprises:

a current or voltage detector for connecting to the input of the cable; and an evaluator that determines when the first, second and third switches should be opened and closed depending on the data input signal and an output signal generated by the current or voltage detector.

3. The apparatus according to claim 1, wherein in the line driver comprises a temperature sensor, and wherein the controller only triggers the third switch once the temperature sensor detects that a predetermined critical temperature has been exceeded.

4. The apparatus according to claim 1, wherein the resistor corresponds in value to a characteristic impedance of the cable), and wherein the cable is terminated with a resistor that has a value greater than the characteristic impedance of the cable.

5. The apparatus according to claim 1, wherein the auxiliary voltage is about half the supply voltage.

6. The apparatus according to claim 1, wherein the auxiliary voltage is a first auxiliary voltage, wherein the controller is also for triggering a fourth switch for applying a second auxiliary voltage to the input of the cable at predetermined points in time, and wherein the first auxiliary voltage has a value lying between the supply voltage and half the supply voltage and the second auxiliary voltage has a value lying between the reference potential and half the supply voltage.

7. The apparatus according to claim 1, wherein the line driver and the resistor are designed as an integrated circuit.

8. The apparatus according to claim 1, wherein the third switch is connected to the reference potential via a capacitor.

9. A line driver for connection to a cable that is mismatched on an output side, comprising:

a resistor for connecting to an input of the cable; and a controller that, depending on a data input signal, is for triggering (a) a first switch to apply a supply voltage at an input of the resistor, (b) a second switch to apply a reference potential at the input of the resistor, and (c) a third switch to apply an auxiliary voltage at an output of the resistor, all of them at predeterminable points in time, in order to minimize power dissipation in the resistor.

* * * * *